Patented Mar. 31, 1931

1,798,972

UNITED STATES PATENT OFFICE

SANDFORD S. COLE, OF PITTSBURGH, PENNSYLVANIA, ASSIGNOR TO THE KOPPERS COMPANY, A CORPORATION OF DELAWARE

REFRACTORY AND METHOD OF MAKING THE SAME

No Drawing.   Application filed June 29, 1927. Serial No. 202,470.

My invention relates to refractory bricks or "shapes", such as silica, magnesite and other refractories capable of withstanding high temperatures and used in coke ovens, high-temperature furnaces and the like.

The general object of my invention is to produce a refractory having a lower degree of porosity than has been possible to obtain by commercial methods employed heretofore.

A further object of my invention is to produce a refractory that is improved with respect to hardness, crushing strength and other physical properties of refractories made by methods heretofore in use.

A still further object of my invention is to provide a refractory composition that shall be improved in strength and other properties in the "green" state—that is, during and after the molding or pressing operation and drying but prior to firing of the resultant product.

Present practice in the manufacture of refractories is to grind the raw material, such as ganister, rock, magnesite, or other material that is to serve as the body of the refractory, adding enough water to form a semi-plastic mass. As a specific example, in the manufacture of silica refractories, to 100 pounds of body material there are added about two pounds of lime and 12 pounds of water. After mixing, the product is pressed or hand-molded into the desired shape. The brick or "shapes" are now dried, being now known as green brick, and are subsequently fired in a kiln at temperatures above 1000° C. to form the required commercial product.

Silica refractories produced by the above method have a porosity of about 25 to 31%. Such bricks are soft, easily chipped by a hammer or in handling, and close examination shows that the grains are not well bonded together. The crushing strength of such brick ranges from 1500 to 2000 pounds per square inch and the modulus of rupture from 400 to 600 pounds per square inch. For most purposes and particularly in coke ovens, it is very desirable that the brick have as low a porosity as can be commercially obtained.

The addition of iron compound, such as hematite or limonite, or other ferruginous ore, is known in the art, but I have found that such substances, even when finely ground and added to the refractory before firing, do not produce results good enough to warrant their use.

My invention consists in incorporating an iron compound in the refractory composition in soluble form. I preferably accomplish this by adding a water-soluble iron compound to the lime solution to be added to the body material, and I prevent precipitation of the iron by means of a suitable agent such as lactic acid or other organic acid or any substance which is capable of preventing the precipitation of the iron compound in the presence of lime or other alkali.

In this manner there is formed an organic salt of iron and calcium, for example, a calcium ferric lactate, which is soluble even under alkaline conditions and therefore is uniformly distributed throughout the mass than is the case when the iron compound is not prevented from precipitating upon alkalinization of the solution.

I also prefer to add a small amount of calcium thiocyanate to the refractory composition, as I have found that its use is beneficial and particularly so in the presence of iron, but the calcium thiocyanate may be omitted wherever it is not desired.

As a specific example of my invention, 100 pounds of semi-plastic mud is prepared by grinding ganister or other body material with a small amount of water, for example, to such fineness that all particles will pass a screen having three openings per square inch. There is then added a solution prepared by adding to 12 pounds of water, two pounds of lime, ½ pound of calcium triocyanate, ½ pound of lactic acid, and one pound of an iron compound, such as ferric chloride, ferric sulphate or the like. This solution may be prepared by dissolving the iron compound, the calcium thiocyanate and the lactic acid in the water and subsequently adding the lime or by making the solution of iron compound and calcium thiocyanate alkaline with lime and subsequently adding the lactic acid.

This solution is well mixed with the body material and may then be pressed or hand-molded into the desired shape, being then dried in the usual manner.

The amounts of materials may be varied somewhat according to the nature of the material and results desired—for example, when the material is to be molded by dry-pressing, the amount of water may be reduced to approximately six pounds per 100 pounds of body material. Moreover, as stated above, the calcium thiocyanate may be omitted when so desired.

Green brick thus prepared according to the method of my invention are much harder and stronger than green brick prepared according to the usual methods and are subject to much less breakage in handling and molding. This is especially true when dry-pressing is resorted to and in the case of magnesite refractories.

Firing is carried out in the usual manner, the green brick being carried to a temperature of about 1490° C. (Orton Cone 18). The resultant brick have been found to possess markedly better characteristics. For example, the porosity has been reduced to 22% in the case of hand-made silica brick and 20% in the case of dry-pressed silica brick. The crushing strength of silica brick made in this manner is about 3500 pounds per square inch and the modulus of rupture is increased to about 1000 pounds per square inch. The brick is hard, not easily chipped and is found, upon examination, to possess an excellent bond.

My invention is not limited to the specific examples given hereinabove by way of illustration, as other iron compounds and other agents for preventing precipitation thereof—for example, tartaric acid or saccharic acid, may be employed in place of lactic acid and my invention is to be construed as of the scope of the following claims.

I claim as my invention:

1. A mortar for making refractory brick composed of a ground refractory oxide mixed with a solution of an iron compound and alkaline earth and a substance capable of preventing precipitation of the iron compound.

2. A mortar for making refractory brick composed of crushed siliceous material mixed with a ferric salt, lime water and an organic acid.

3. A mortar for making refractory brick composed of crushed ganister mixed with a solution of ferric chloride, lime and lactic acid.

4. A refractory composition comprising a mixture of 200 parts of ganister, 2 parts of ferric chloride, one part of lactic acid, one part of calcium thiocyanate, 4 parts of lime and 24 parts of water.

5. A refractory composition comprising crushed silica mixed with a solution of a ferric salt and organic salt, calcium thiocyanate and lime.

6. A refractory formed from a silica body mixed with a ferric salt, lime, an organic acid and water, molded, dried and fired.

7. A refractory formed from a silica body mixed with a ferric salt, lime, an organic acid, calcium thiocyanate and water, molded, dried and fired.

8. The method of producing a refractory which comprises mixing pulverized silica with a soluble iron compound and an organic substance capable of preventing precipitation of said iron compound, adding lime as necessary, molding the mixture and then drying and fixing the same.

9. The method of producing a refractory which comprises mixing pulverized silica with a soluble iron compound and lactic acid, adding lime as necessary, molding the mixture and then drying and fixing the same.

10. The method of producing a refractory which comprises mixing pulverized silica with a soluble iron compound and an organic acid, adding lime as necessary, molding the mixture and then drying and fixing the same.

11. A mortar for making refractory brick composed of ground refractory oxide in admixture with a solution of an organic salt of iron.

12. A mortar for making refractory brick composed of ground refractory oxide in admixture with a solution of calcium ferric lactate.

13. A mortar for making refractory brick composed of ground refractory oxide in admixture with a solution of calcium ferric tartrate.

14. A mortar for making refractory brick composed of ground refractory oxide in admixture with a solution of calcium ferric saccharate.

In testimony whereof, I have hereunto subscribed my name this 27th day of June, 1927.

SANDFORD S. COLE.